US011709884B2

(12) United States Patent
Leydon et al.

(10) Patent No.: US 11,709,884 B2
(45) Date of Patent: Jul. 25, 2023

(54) METHOD AND SYSTEM FOR PROVIDING A COMPACT GRAPHICAL USER INTERFACE FOR FLEXIBLE FILTERING OF DATA

(71) Applicant: Disney Enterprises, Inc., Burbank, CA (US)

(72) Inventors: Krispin J. Leydon, La Canada Flintridge, CA (US); Douglas E. Lesan, Los Angeles, CA (US); Matthew F. Schnittker, Castaic, CA (US); Dale Roger Beck, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 554 days.

(21) Appl. No.: 15/922,631

(22) Filed: Mar. 15, 2018

(65) Prior Publication Data

US 2018/0203854 A1    Jul. 19, 2018

Related U.S. Application Data

(63) Continuation of application No. 13/185,892, filed on Jul. 19, 2011, now Pat. No. 9,953,039.

(51) Int. Cl.
*G06F 16/583* (2019.01)
*G06F 16/9535* (2019.01)

(52) U.S. Cl.
CPC ...... *G06F 16/5838* (2019.01); *G06F 16/5846* (2019.01); *G06F 16/9535* (2019.01)

(58) Field of Classification Search
CPC ............ G06F 16/5838; G06F 16/5846; G06F 16/9535
See application file for complete search history.

(56) References Cited

U.S. PATENT DOCUMENTS

| | | | | |
|---|---|---|---|---|
| 7,685,132 | B2 * | 3/2010 | Hyman ................... | G06Q 30/02 707/999.01 |
| 8,352,397 | B2 * | 1/2013 | Rubin ...................... | G06N 5/04 706/45 |
| 9,183,288 | B2 * | 11/2015 | Murray .................. | G06F 16/358 |
| 2008/0091771 | A1 * | 4/2008 | Allen ...................... | G06Q 10/10 709/203 |
| 2008/0182563 | A1 * | 7/2008 | Wugofski .............. | G06Q 10/10 455/414.2 |
| 2008/0183678 | A1 * | 7/2008 | Weston .................. | G06F 16/335 |

(Continued)

*Primary Examiner* — Nicholas Augustine
(74) *Attorney, Agent, or Firm* — Farjami & Farjami LLP

(57) ABSTRACT

There is presented a method and system for providing a compact graphical user interface for flexible filtering of data. The method comprises showing a search interface on a display device for filtering a content set by a plurality of domains, including a first domain, displaying, within the search interface, a first graphical representation of a parameter set of the first domain in response to a selecting of the first domain, receiving a first parameter subset from the first graphical representation, filtering a content set using the first parameter subset to obtain a search result, and displaying the search result on a display device. The search interface includes a temporally visible menu for selecting parameter sets of the domains and a compact single line query box to display graphical representations of parameter sets or to provide a conventional text entry box.

20 Claims, 12 Drawing Sheets

(56) References Cited

U.S. PATENT DOCUMENTS

2011/0137895 A1\* 6/2011 Petrou ................... G06F 16/242
  707/723
2016/0103894 A1\* 4/2016 Rubinstein .......... G06F 16/2423
  707/722

\* cited by examiner

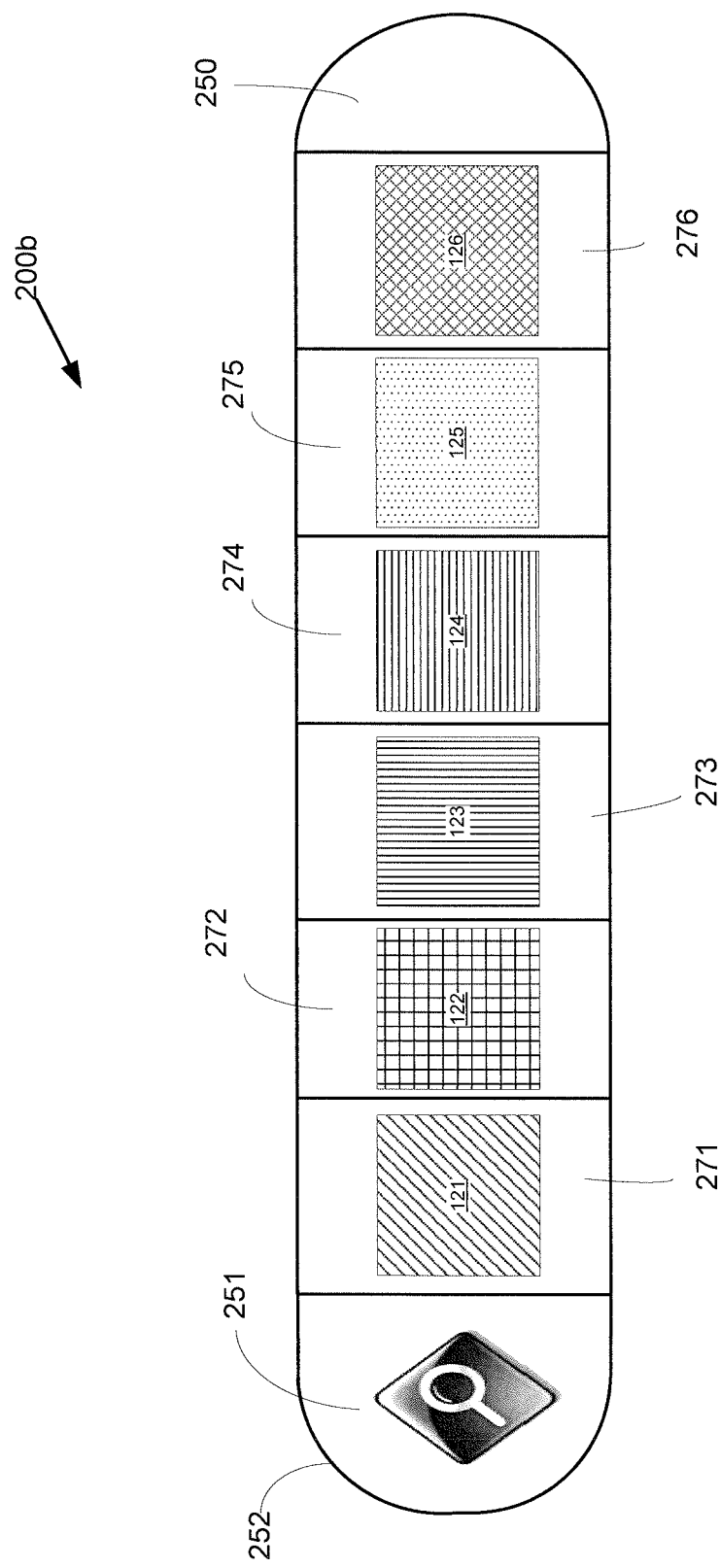

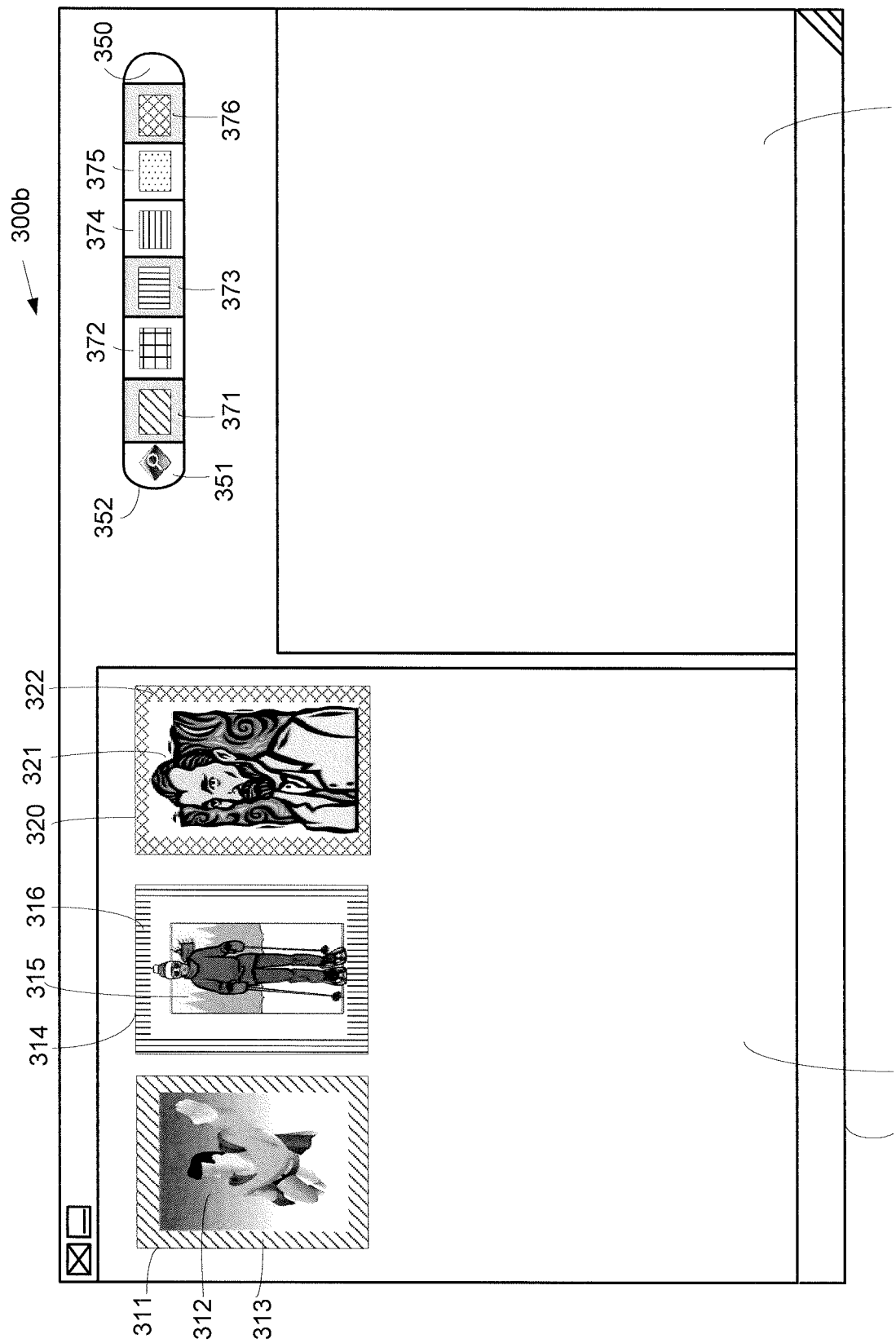

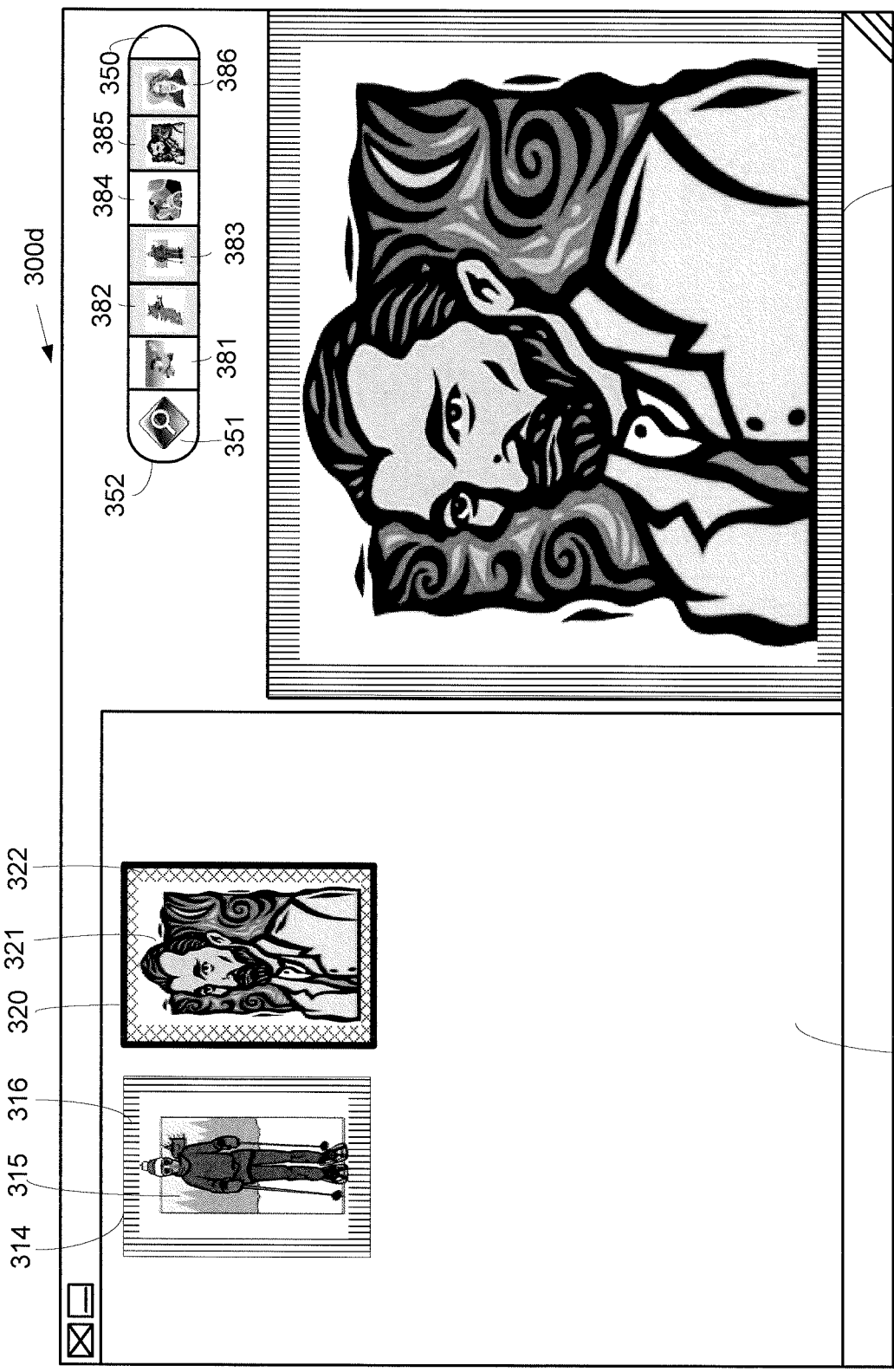

METHOD AND SYSTEM FOR PROVIDING A COMPACT GRAPHICAL USER INTERFACE FOR FLEXIBLE FILTERING OF DATA

The present application is a Continuation of U.S. patent application Ser. No. 13/185,892, filed Jul. 19, 2011, which is hereby incorporated by reference in its entirety into the present application.

BACKGROUND OF THE INVENTION

1. Field of the Invention

The present invention relates generally to providing a compact graphical user interface. More particularly, the present invention relates to providing a compact graphical user interface for flexible filtering of data.

2. Background Art

There are constant attempts in the art to create search interfaces for filtering digital data with ever increasing accuracy to find desired content more quickly and easily. Search interfaces are often equipped with multiple search components to perform multiple domain searches for increased search accuracy. However, using only conventional textual search components may be insufficient or inefficient for filtering certain kinds of digital data. Thus, it is useful to incorporate non-textual search components into search interfaces to perform facilitated searches on digital data.

However, there are substantial shortcomings in using conventional search interfaces having multiple search components. Conventional search interfaces having multiple search components often require reserving a large portion of the user interface area, which is a valuable and limited resource. For example, to support multiple search domains, multiple search components are required, each component reserving dedicated user interface area. Furthermore, these multiple search components often add confusion to the user experience, thereby decreasing intuitive usability. For example, a conventional user interface may present a user with two separate interface elements A and B for filtering search results. It may be unclear whether element A and/or element B is affecting the search. Thus, the user may be confused as to which one of the multiple search components may be actually driving the data search.

Accordingly, there is a need to overcome the drawbacks and deficiencies in the art by providing a compact graphical user interface, using minimal interface area, for flexible filtering of data.

SUMMARY OF THE INVENTION

There are provided methods and systems for providing a compact graphical user interface for flexible filtering of data, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2b presents a diagram of a search interface displaying graphical icons in response to selection of the color tags domain in FIG. 2a, according to one embodiment of the present invention;

FIG. 3b presents a diagram of a compact graphical user interface after filtering the content set using the colors tag domain shown in FIG. 3a, according to one embodiment of the present invention;

FIG. 3d presents a diagram of the compact graphical user interface after filtering a content set using an image data domain and a color tags domain selected in FIG. 3b, according to one embodiment of the present invention.

DETAILED DESCRIPTION OF THE INVENTION

The present application is directed to a method and system for providing a compact graphical user interface for flexible filtering of data. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
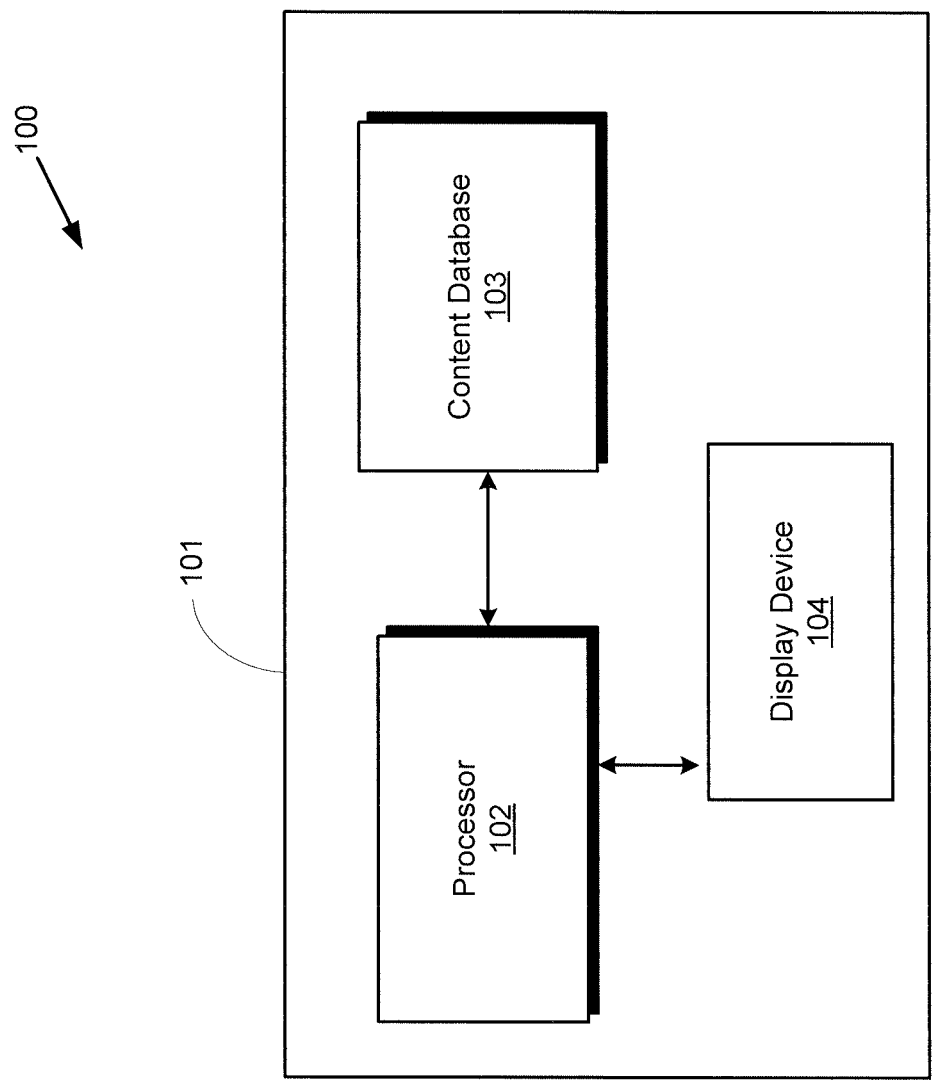
FIG. 1 presents a diagram of a for displaying the search interface for flexible filtering of data.

FIG. 1 presents a diagram for displaying the search interface for flexible filtering of data. Diagram 100 includes system 101. System 101 includes processor 102, content database 103, and display device 104.

System 101 may be a conventional computer such as a desktop computer, a laptop, or a tablet personal computer (PC), each with processor 102, content database 103, and display device 104 residing within. System 101 may also comprise a setup environment in which processor 102, content database 103, and display device 104 may reside in one or more different locations but are connected together through physical data links add/or other physical or wireless connections through a public or private network. Accordingly, system 101 may also comprise a mobile device such as a mobile phone, media player, digital camera, or video camera.

Processor 102 may be any type of computing processor, such as an Intel Core. Content database 103 may be contained in any data storage drive or memory storage device. Display device 104 may be any type of display component such as, for example, a liquid crystal display (LCD) monitor. Content database 103 may contain one or more content sets for filtering by a search interface. A content set may comprise a set of digital data, such as text, dialog, keywords, images, videos, sound clips, and any other type of textual or non-textual data. Moreover, a content set is not necessarily limited to a single type of data, and may contain mixed types of data. For example, text, images, sound data, and video data may all be included in a single content set. Processor 102 may use data entered into search interface to filter one or more content sets residing within content database 103 and present the search results onto display device 104. Search interface may also be presented on display device 104 as part of a graphical user interface for a front-end web server or a locally executed software application. Thus, in some embodiments, content database 103 may be located outside of system 101.

It may be important and useful for a search interface to have the capability of filtering digital data using non-textual or graphical representations of parameter sets. For example, a movie production studio may have a content set including digital images of scenes for a particular animated project currently in development. Each of these digital images may be at various stages of production and may require additional coloring, rendering, touchup alterations, or substantial graphical developments. To assist in identification, colored borders may be placed around each digital image and each color may indicate one of the many different states of production the digital image may be in. Thus, all of the digital images in this content set may be classified by their respective border colors. To filter the content set for digital data at particular states, a search interface may be designed to match the border colors of the digital images to border color elements from a color tags domain, which may be presented to the user as a graphical representation of a parameter set, for example comprising solid color icons selectable within a graphical user interface.

Thus, a "parameter set" as used in this application refers to elements selected from one or more textual or non-textual domains, and may be presented by one or more graphical representations including labeled buttons, graphical icons, character or personality images, and other graphics. A parameter set may also be a textual parameter set of one or more textual or non-textual domains, allowing text entry for searching by a textual parameter.

The digital images within the content set may be classified into several different domains. The term "domain" as used in this application refers to a classification or categorization by which a content set may be filtered or searched. For example, the digital images of the content set may be classified by non-textual characteristics such as color tags, associated sound clips, image data, three-dimensional models, icons, or other types of non-textual domains. The content set may be classified under textual domains as well, including keywords, tags, scene dialogue, authorship metadata, file system or database fields, and other textual data fields. A search interface may then filter the content set by presenting graphical representations of parameter sets from the various textual or non-textual domains.

Thus, textual domains may be searched using non-textual or graphical representations of parameter sets. For example, graphical icons representing characters or personalities may be presented to a user as a graphical representation of a parameter set corresponding to a scene dialogue domain. The user may then select from the graphical icons to return search results with textual scene dialogues spoken by the corresponding characters or personalities. Another example may present a parameter set graphically represented by labeled buttons corresponding to categories of a manuscript text domain, for example "Dialogue", "Sound Effects", "Internal Comments", and "Acting Directions". The user may then click on a labeled button to return manuscript text matching the selected category.

Figure 2A:
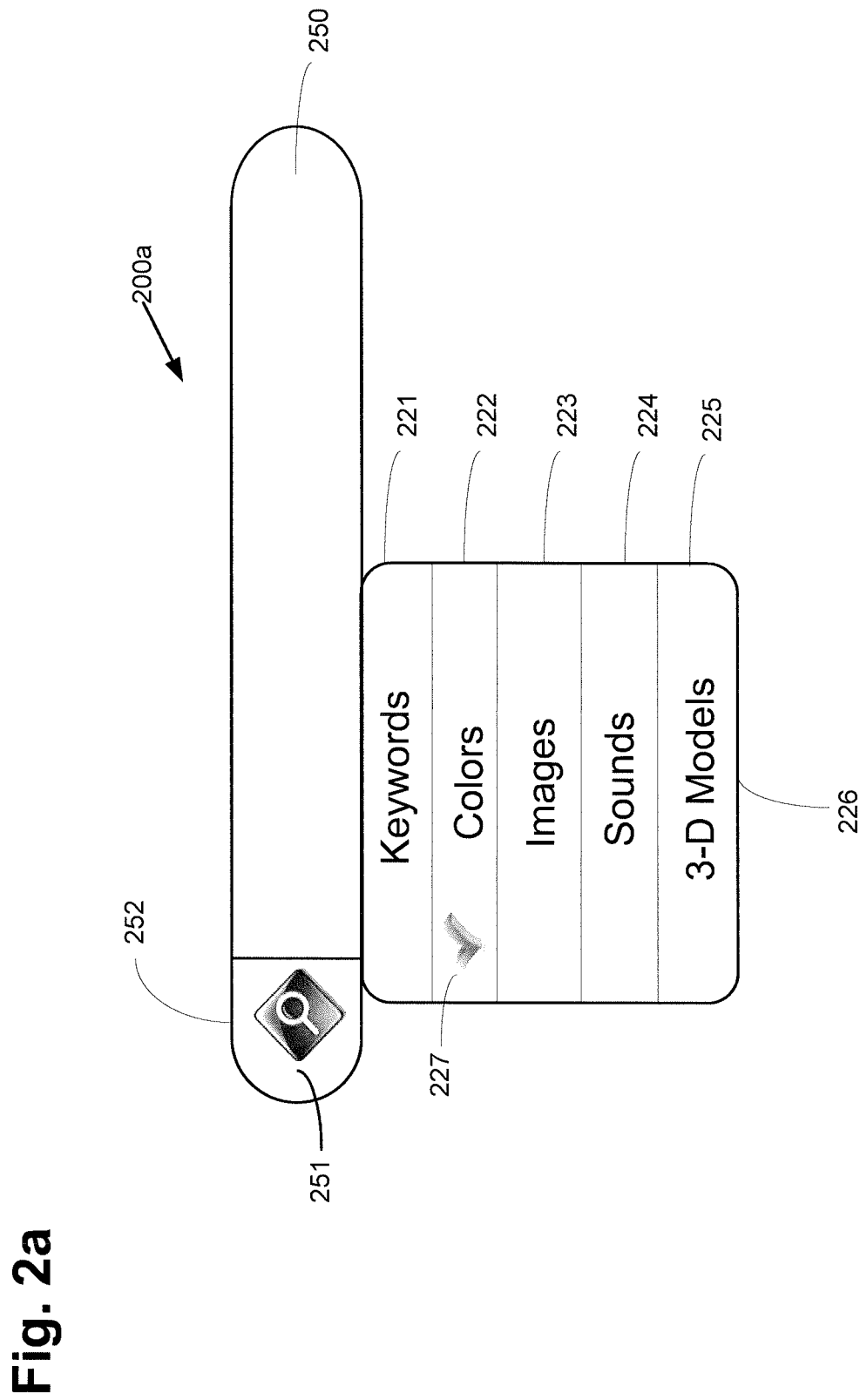
FIG. 2a presents a diagram of a search interface receiving a selection of the color tags domain, according to one embodiment of the present invention.

Turning to FIG. 2a, FIG. 2a presents a diagram of a search interface receiving a selection of the color tags domain, according to one embodiment of the present invention. Diagram 200a of FIG. 2a includes search interface 252. Search interface 252 comprises query field 250, search button 251, and drop down box 226. Drop down box 226 comprises keywords button 221, colors button 222, images button 223, sounds button 224, and three-dimensional models button 225. Color button 222 further includes check mark 227.

Drop down box 226 may be a drop down menu or any type of drop down graphical component comprising a list of options. Drop down box 226 may also comprise any other type of menu, for example a radial menu. When drop down box 226 may be needed, search interface 252 may make drop down box 226 visible for access. When drop down box 226 may no longer be needed, search interface 252 may remove drop down box 226 from visibility. Thus, the menu, or drop down box 226, may be only temporally visible within the user interface, being shown only as necessary to minimize user interface space requirements. Furthermore, in this embodiment of the invention, when drop down box 226 appears, query field 250 may be cleared of any text or graphics. In other embodiments of the invention, the contents in query field 250 may remain unchanged when drop down box 226 appears.

Colors button 222, images button 223, sounds button 224, and three-dimensional models button 225 may each represent a parameter set associated with a domain and may each correspond to color tags domain, image data domain, sound clips domain, and three-dimensional models domain, respectively. As explained earlier, color tags domain may be presented using a graphical representation of a parameter set for matching color borders of the data in the content set. Image data domain may be presented using a graphical representation of a parameter set for matching character or personality images to the content set. Sound clips domain may be presented using a graphical representation of a parameter set for matching sound clips in the content set. A three-dimensional models domain may be presented using a graphical representation of a parameter set for matching three-dimensional graphical objects in the content set. Keywords button 221 may correspond to an option to allow query field 250 to accept text entry for searching or filtering one or more domains of the content set by a textual parameter. In other embodiments of the invention, drop down box 226 may contain any number of parameter sets to search and filter any number and combination of textual and non-textual domains. Thus, the user may select from a plurality of parameter sets for filtering a content set by one or more of a plurality of domains.

At least one parameter set corresponding to a first domain may need to be selected initially to filter the content set. Alternatively, a default parameter set may be selected. The user may select a first domain by placing check mark 227 into colors button 222, images button 223, sounds button 224, or three-dimensional models button 225. In FIG. 2*a*, check mark 227 may be placed into colors button 222, indicating the selection of a first domain, the color tags domain. In other embodiments of the invention, check mark 227 may be placed into multiple graphical buttons for selection of multiple domains.

Proceeding to FIG. 2*b*, FIG. 2*b* presents a diagram of a search interface displaying graphical icons in response to selection of the color tags domain in FIG. 2*a*, according to one embodiment of the present invention. Diagram 200*b* of FIG. 2*b* includes search interface 252. Search interface 252 includes query field 250, and search button 251. Query field 250 includes graphical icons 271, 272, 273, 274, 275 and 276. With respect to FIG. 2*b*, elements with like number may correspond to similar elements in FIG. 2*a*.

Graphical icons 271-276 may be displayed within query field 250 after selection of colors button 222 of FIG. 2*a*, which may correspond to the selection of color tags domain. Query field 250 may be a single line query box capable of displaying text or images. Graphical icons 271-276 may represent a first graphical representation of a parameter set associated with the first domain selected in FIG. 2*a*. In an embodiment of the invention as shown in FIG. 2*b*, graphical icons 271-276 may correspond to red border element, orange border element, yellow border element, green border element, blue border element, and purple border element, respectively, of the color tags domain. While the color tags domain is presented as a parameter set of graphical icons, parameter sets may also comprise labeled buttons, or character or personality images. As will be described in further detail below, any number of graphical icons 271-276 may be selected to form first parameter subset for filtering a content set.

Figure 2C:
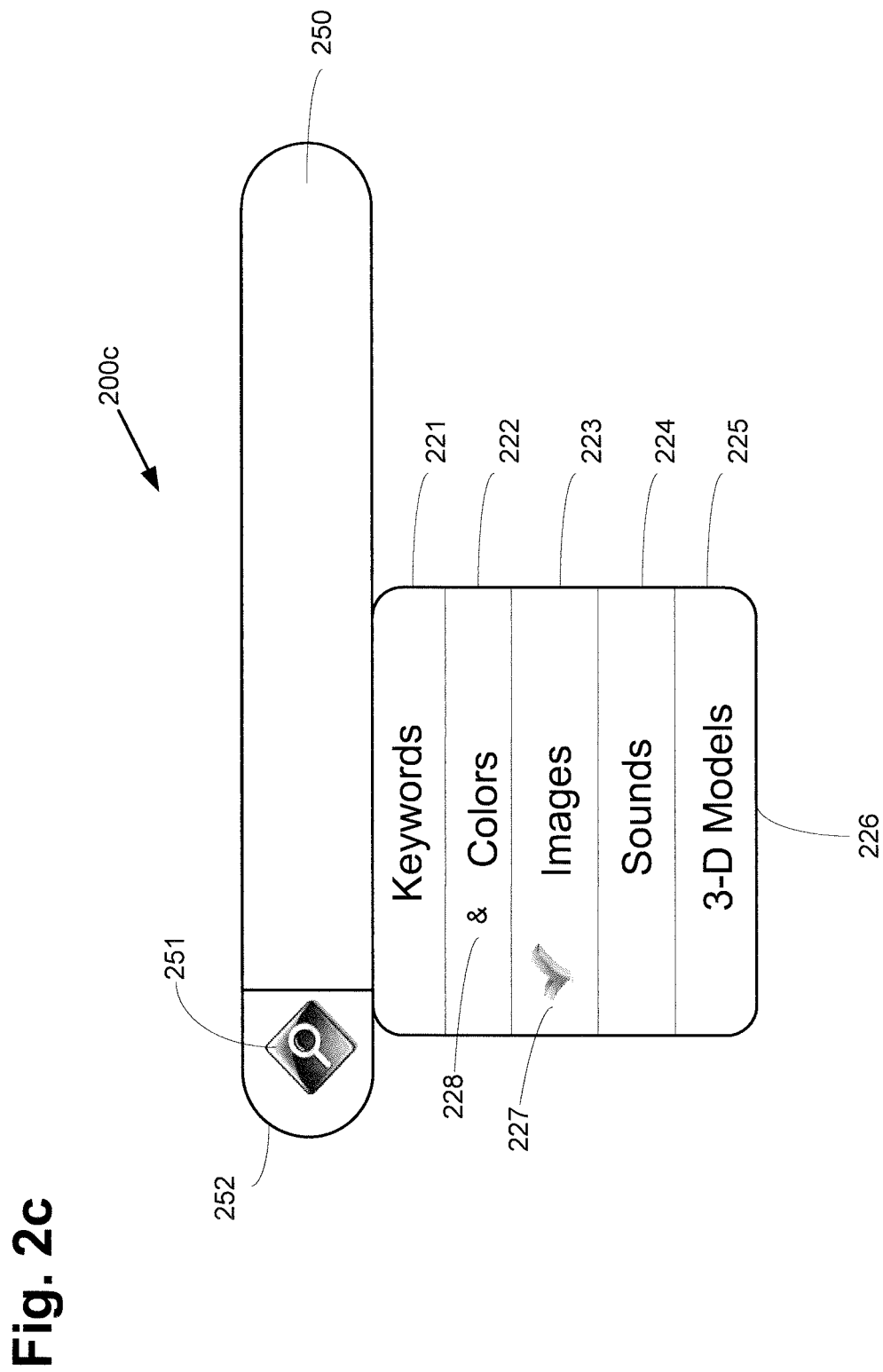
FIG. 2c presents a diagram of a search interface receiving a selection of the image data domain after receiving a selection of the color tags domain in FIG. 2a, according to one embodiment of the present invention.

FIG. 2*c* presents a diagram of a search interface receiving a selection of the image data domain after receiving a selection of the color tags domain in FIG. 2*a*, according to one embodiment of the present invention. Diagram 200*c* of FIG. 2*c* includes search interface 252. Search interface 252 comprises query field 250, search button 251, and drop down box 226. Drop down box 226 comprises keyword button 221, colors button 222, images button 223, sounds button 224, and three-dimensional models button 225. Images button 223 and colors button 222 include check mark 227 and ampersand 228, respectively. With respect to FIG. 2*c*, elements with like number may correspond to similar elements in FIG. 2*a*.

Check mark 227 has been placed into images button 223 to indicate a selection of a second domain, the images data domain. Ampersand 228 placed within colors button 222 may indicate that the first parameter subset selected from color tags domain may be further combined with the second parameter subset that may be selected from the image data domain and included into a search query. In this embodiment of the invention as shown in FIG. 2*c*, ampersand 228 may configure the filtering mechanism to return data from the content set that matches with at least one of the elements in the first parameter subset and with at least one of the elements of a second parameter subset that may be selected from image data domain, as will be explained below. Thus, in various embodiments of the invention, ampersand 228 may correspond to a Boolean AND filtering methodology, as known in the art.

Figure 2D:
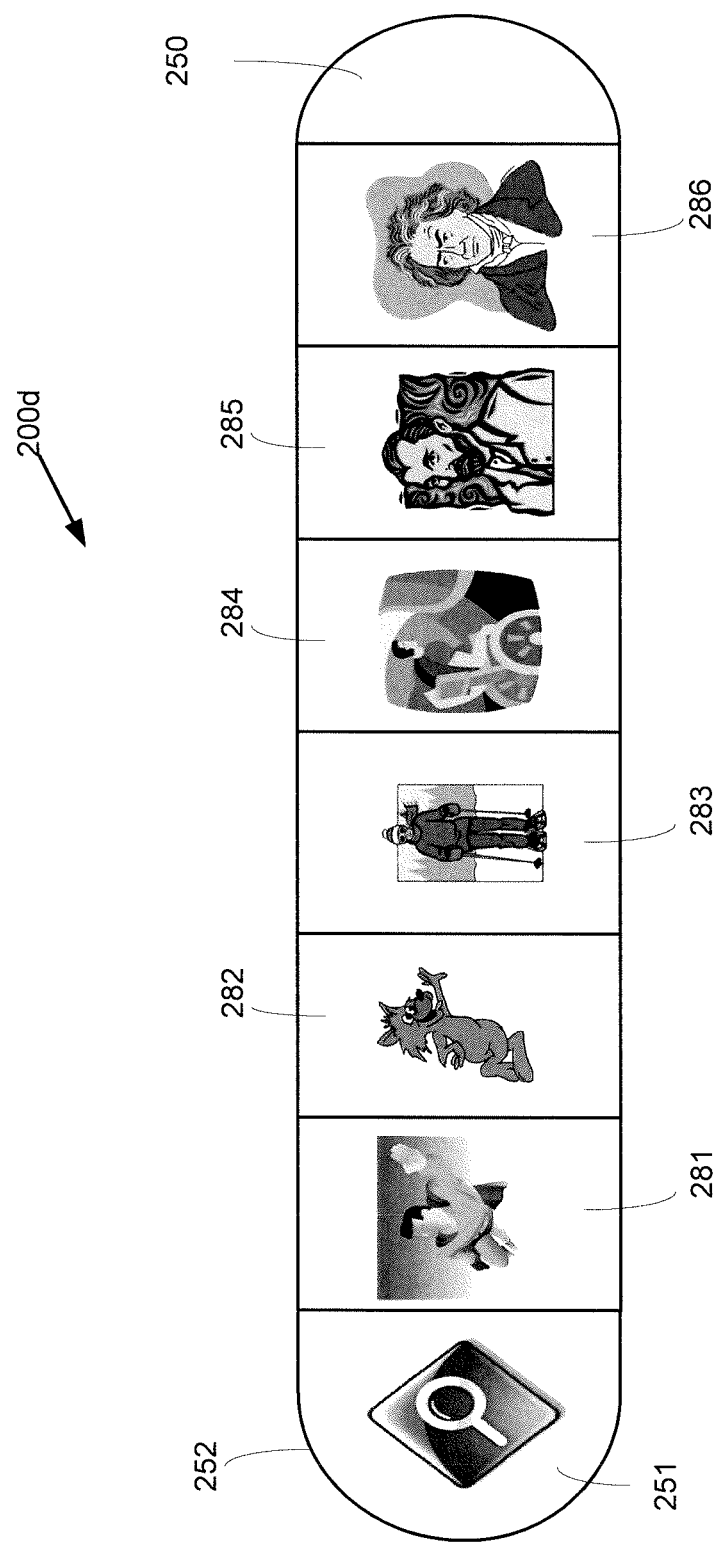
FIG. 2d presents a diagram of a search interface displaying character or personality images in response to selection of image data domain in FIG. 2c, according to one embodiment of the present invention.

Moving on, FIG. 2*d* presents a diagram of a search interface displaying character or personality images in response to selection of image data domain in FIG. 2*c*, according to one embodiment of the present invention. Diagram 200*d* of FIG. 2*d* includes search interface 252. Search interface 252 includes query field 250, and search button 251. Query field 250 includes character images 281, 282, 283, 284, 285 and 286. With respect to FIG. 2*d*, elements with like number may correspond to similar elements in FIG. 2*c*.

After selection of the image data domain in FIG. 2*c*, query field 250 may display the second graphical representation of a parameter set of the image data domain as character images 281-286. In the embodiment of the invention as shown in FIG. 2*d*, character images 281-286 may correspond to superhero element, friendly wolf element, skier element, wheelchair person element, famous painter element, and famous composer element, respectively. As explained earlier, the user may select any combination of character images 281-286 to form a second parameter subset for filtering the content set.

Figure 2E:
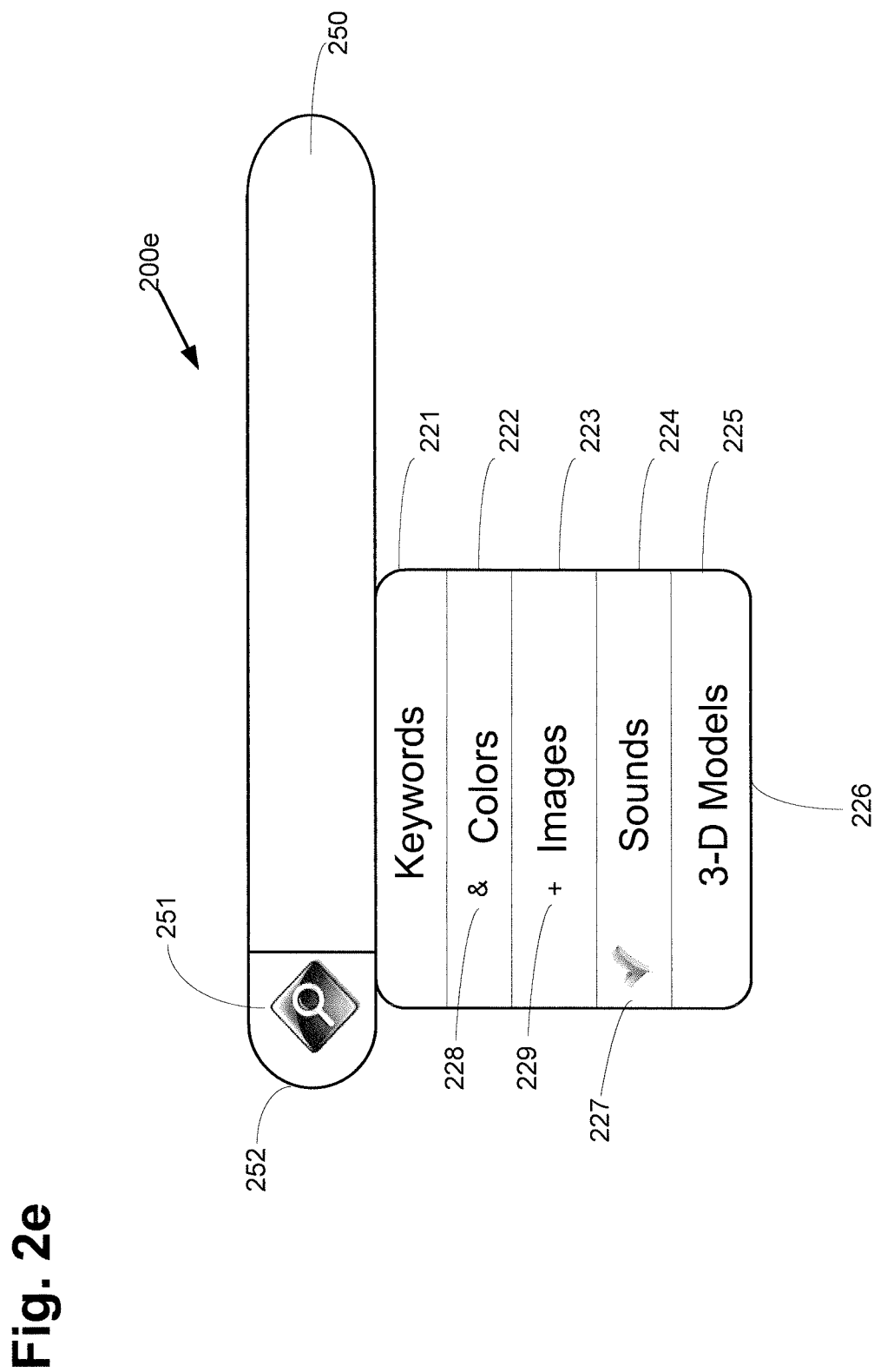
FIG. 2e presents a diagram of a search interface receiving a selection of the sound samples domain after receiving a selection of color tags domain in FIG. 2a and image data domain in FIG. 2c, according to one embodiment of the present invention.

Moving to FIG. 2*e*, FIG. 2*e* presents a diagram of a search interface receiving a selection of the sound samples domain after receiving a selection of color tags domain in FIG. 2*a* and image data domain in FIG. 2*c*, according to one embodiment of the present invention. Diagram 200*e* of FIG. 2*e* includes search interface 252. Search interface 252 comprises query field 250, search button 251, and drop down box 226. Drop down box 226 comprises keywords button 221, colors button 222, images button 223, sounds button 224, and three-dimensional models button 225. Sounds button 224, images button 223, and colors button 222 includes check mark 227, plus sign 229, and ampersand 228, respectively. With respect to FIG. 2*e*, elements with like number may correspond to similar elements in FIG. 2*c*.

In FIG. 2*e*, check mark 227 has been placed into sounds button 224, which indicates the selection of the sound samples domain. Ampersand 228 appears within colors button 222 indicating that the previously selected first parameter subset may be included in the search query, as explained earlier. Plus sign 229 appears within images button 223 indicating that the second parameter subset selected from FIG. 2*d* may also be included in the search query. Unlike ampersand 228, plus sign 229 may indicate that, during filtering of content set, any data matching at least one of the elements in the parameter subset associated with images data domain alone may be included in the search result. Thus, in various embodiments of the invention, plus sign 229 may correspond to a Boolean OR filtering methodology, as known in the art.

Figure 2F:
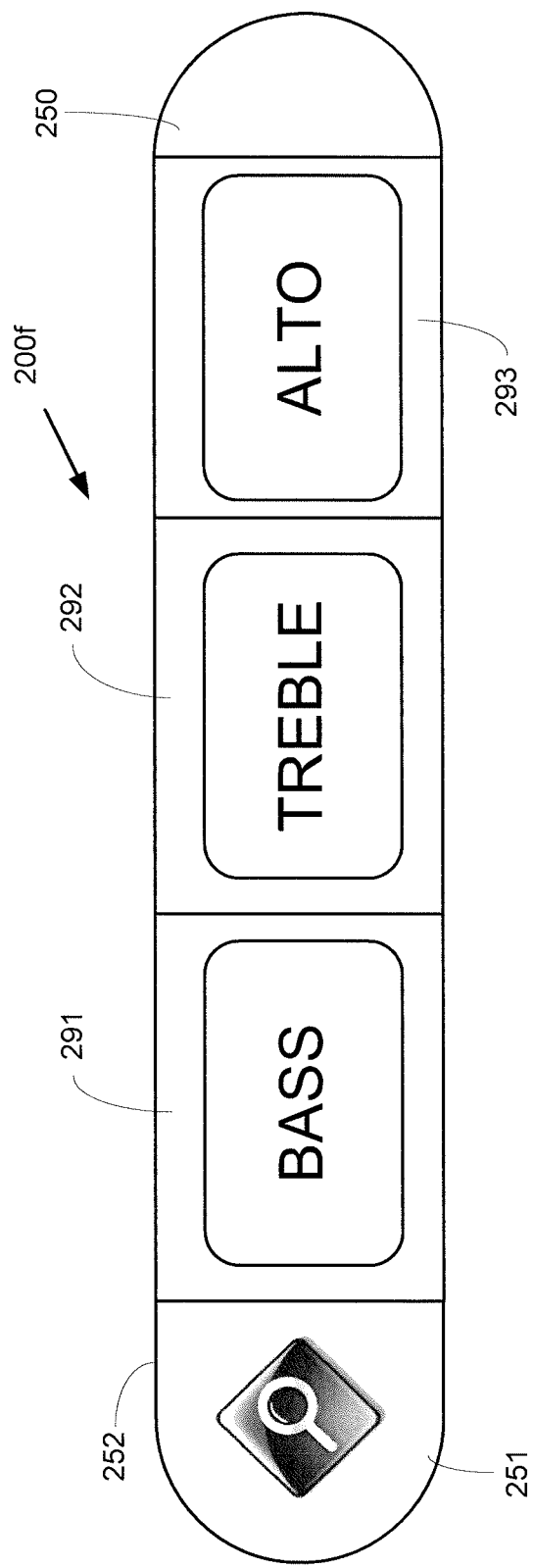
FIG. 2f presents a diagram of a search interface displaying labeled buttons in response to selection of sound samples domain in FIG. 2e, according to one embodiment of the present invention.

FIG. 2*f* presents a diagram of a search interface displaying labeled buttons in response to a selection of sound samples domain in FIG. 2*e*, according to one embodiment of the present invention. Diagram 200*f* of FIG. 2*f* includes search interface 252. Search interface 252 includes query field 250 and search button 251. Query field 250 includes labeled buttons 291, 292 and 293. With respect to FIG. 2f, elements with like numbers may correspond to similar elements in FIG. 2e.

After selecting sound samples domain in FIG. 2e, labeled buttons 291-293 may be displayed in query field 250. Labeled buttons 291-293 may correspond to a bass sound element, a treble sound element, and an alto sound element, respectively. As explained earlier, the user may select any combination of labeled buttons 291-293 in query field 250 to form another parameter subset for inclusion into a search query for filtering a content set.

Together, FIGS. 2a, 2b, 2c, 2d, 2e, and 2f demonstrate using search interface 252 with one query field 250 to select from multiple graphical representations of parameter sets of corresponding domains for use in filtering a content set. Additionally, conventional text entry boxes for textual parameter sets may also be supported in the same query field 250, as previously described. FIGS. 3a, 3b, 3c, and 3d, as described in further detail below, will describe using search interface 252 within an application interface to filter a content set.

Figure 3A:
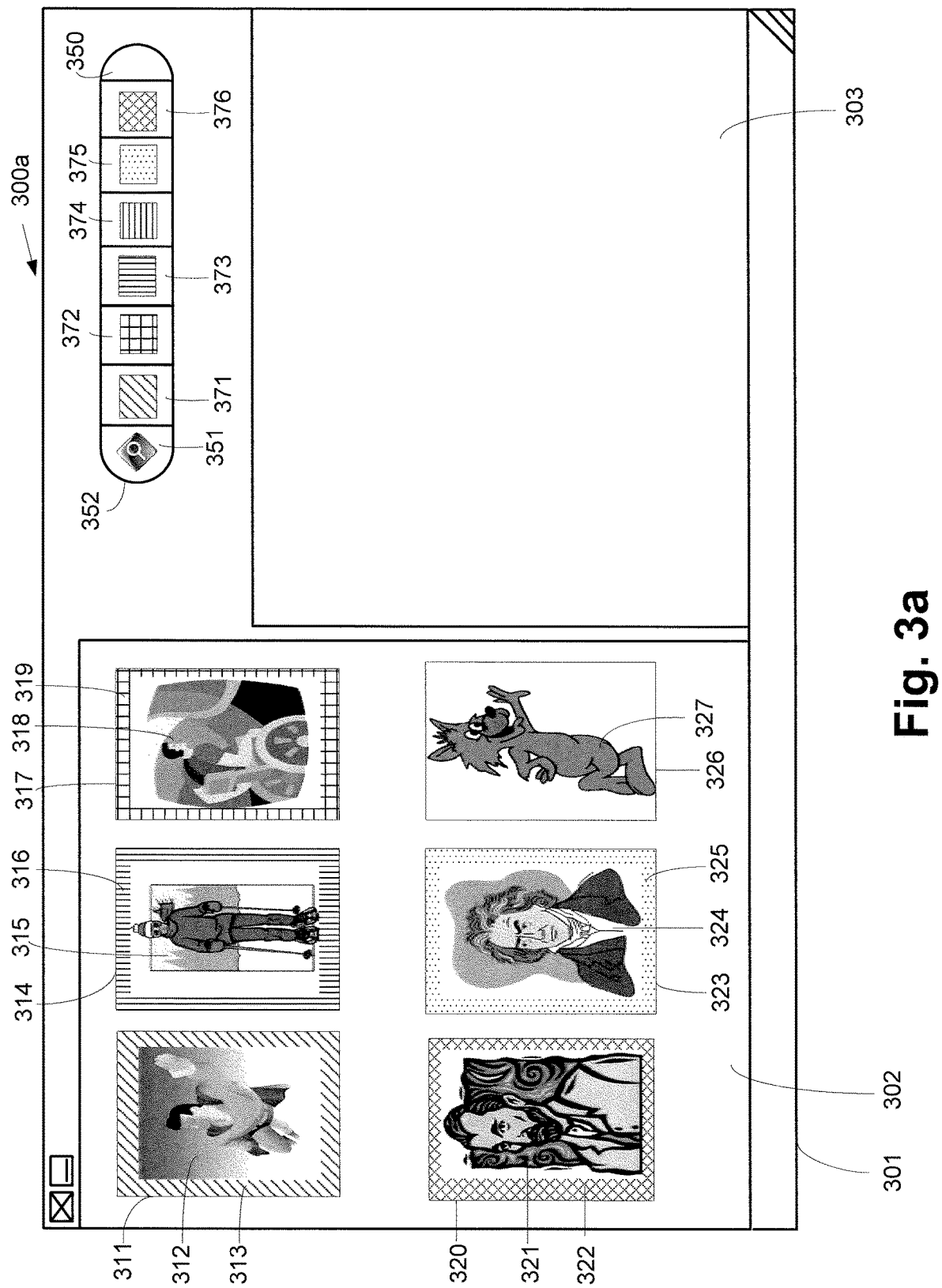
FIG. 3a presents a diagram of a compact graphical user interface with a search interface displaying the color tags domain, according to one embodiment of the present invention.

FIG. 3a presents a diagram of a compact graphical user interface with a search interface displaying the color tags domain, according to one embodiment of the present invention. Diagram 300a of FIG. 3a includes application interface 301. Application interface 301 includes filtered content panel 302, selected content panel 303, and compact search interface 352. Filtered content panel 302 includes digital picture 311, 314, 317, 320, 323, and 326. Digital picture 311 includes superhero character 312 and red border 313. Digital picture 314 includes skier character 315 and yellow border 316. Digital picture 317 includes wheelchair character 318 and orange border 319. Digital picture 320 includes famous painter character 321 and purple border 322. Digital picture 323 includes famous musician character 324 and blue border 325. Digital picture 326 includes friendly wolf character 327. Compact search interface 352 includes query field 350 and search button 351. Query field 350 includes graphical icons 371, 372, 373, 374, 375 and 376. Compact search interface 352, query field 350, and search button 351 may correspond to search interface 252, query field 250, and search button 251 of FIG. 2a, respectively. Graphical icons 371-376 may correspond to graphical icons 271-276 of FIG. 2b, respectively.

Application interface 301 may be any type of graphical user interface (GUI). Application interface 301 may reside within the user interface of a front end webpage, a standalone application, a plug-in or secondary application, a desktop or mobile application, and within user interfaces for devices such as tablet computers, digital cameras, video cameras, and mobile media players. Query field 350 may display the first graphical representation of a parameter set of the colors tag domain after selection of the color tags domains, as previously explained. In the embodiment of the invention as shown in FIG. 3a, the content set comprises digital pictures 311, 314, 317, 320, 323, and 326. In one embodiment of the invention as shown in FIG. 3a, every item in content set may be displayed in filtered content panel 302. Since the content set has not been filtered, filtering content panel 302 may display all elements of content set. Selected content panel 303 may present a magnified view of any selected item in filtered content panel 302. Selected content panel 303 of FIG. 3a may currently be empty since no item from filtered content panel 302 has been selected.

Moving on, FIG. 3b presents a diagram of a compact graphical user interface after filtering the content set using the colors tag domain shown in FIG. 3a, according to one embodiment of the present invention. Diagram 300b of FIG. 3b includes application interface 301. Application interface 301 includes filtered content panel 302, selected content panel 303 and compact search interface 352. Filtered content panel 302 includes digital pictures 311, 314, and 320. Digital picture 311 includes superhero character 312 and red border 313. Digital picture 314 includes skier character 315 and yellow border 316. Digital picture 320 includes famous painter character 321 and purple border 322. Compact search interface 352 includes query field 350 and search button 351. Query field 350 includes graphical icons 371-376. With respect to FIG. 3b, elements with like numbers may correspond to similar elements in FIG. 3a.

In FIG. 3b, filtering of a content set has been performed using graphical icon 371, 373, and 376. As explained earlier, graphical icons 371-376 may represent a first graphical representation of a parameter set of the color tags domain. Graphical icon 371, 373, and 376 have been selected to form a first parameter subset. Search button 352 may be pressed to filter the content set using the first parameter subset. Filtering the content set adds digital pictures 311, 314, and 320 into a search result. The search result may then be displayed in filtered content panel 302.

By selecting graphical icon 371, 373, and 376, the user has selected red border element, yellow border element, and purple border element, respectively, from color tags domain to be used search elements for filtering the content set. During filtering of the content set, any digital data classified by a red, yellow, or purple colored border will be returned as part of the search result. Therefore, filtering the content set in FIG. 2b may generate a search result comprising digital picture 311, 314 and 320, which have all have a border color characteristics matching one of the border color elements specified by graphical icon 371, 373, or 376. As explained earlier, digital data within the content set may be classified by border color or another domain. Compact search interface 352 may be updated with any number of domains to match against digital data within a content set.

Figure 3C:
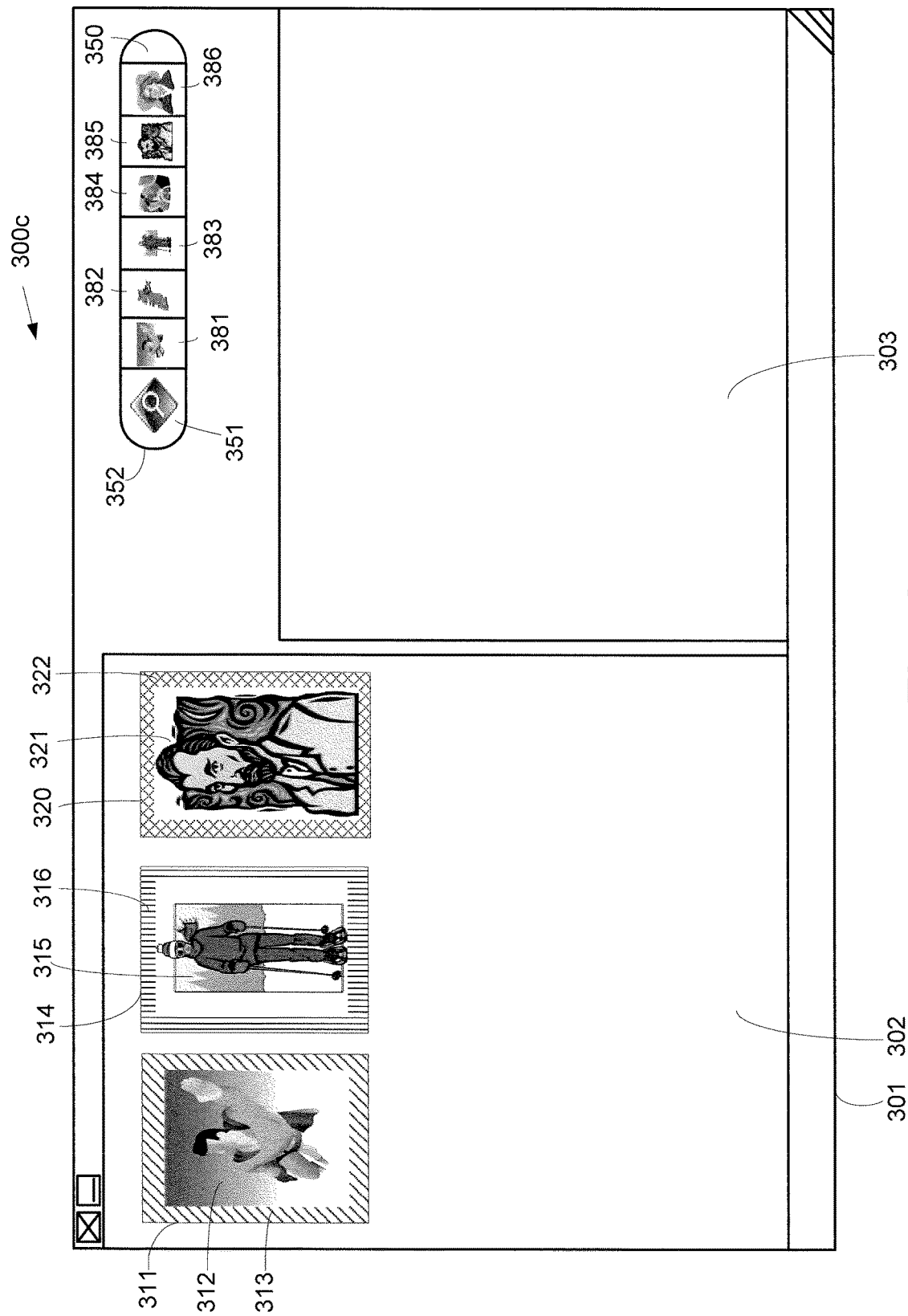
FIG. 3c presents a diagram of the compact graphical user interface with the search interface replacing a color tags domain in FIG. 3b with an image data domain, according to one embodiment of the present invention.

FIG. 3c presents a diagram of the compact graphical user interface with the search interface replacing a color tags domain in FIG. 3b with an image data domain, according to one embodiment of the present invention. Diagram 300c of FIG. 3c includes application interface 301. Application interface 301 includes filtered content panel 302, selected content panel 303 and compact search interface 352. Filtered content panel 302 includes digital picture 311, 314, and 320. Digital picture 311 includes superhero character 312 and red border 313. Digital picture 314 includes skier character 315 and yellow border 316. Digital picture 320 includes famous painter character 321 and purple border 322. Compact search interface 352 includes query field 350 and search button 351. Query field 350 includes character images 381, 382, 383, 384, 385 and 386. With respect to FIG. 3c, elements with like numbers may correspond to similar elements in FIG. 3b. Character images 381-386 may correspond to character image 281-286 of FIG. 2d, respectively.

In FIG. 3c, in response to a prior selection of the image data domain, query field 350 may replace graphical icons 371-376 of FIG. 3b with a second graphical representation of a parameter set, character images 381-386. Filtered content panel 302 may display digital picture 311, 314, and 320, or the search result from FIG. 3b. Filtered content panel 302 may continue to display digital picture 311, 314, and 320 obtained in FIG. 3b until another filtering of the content set generates a different search result.

Alternatively, instead of showing a graphical representation, query field 350 may also be replaced with a conventional single line text entry box in response to a prior selection of a parameter set that may be more suited for textual search. For example, the user may have selected the keywords button 221 of FIG. 2a. The user may then type into query field 350 the word "John" as a textual parameter, allowing the user to, for example, search by authorship by matching an "Author" domain, find utterances of "John" in a "Dialog" domain, identify files including "John" in a "Filename" domain, and other textual domains. Additionally, non-textual domains may be searched as well; for example, if the textual parameter is "Red", then a color tags domain may be searched for red color tag entries. While keyword button 221 of FIG. 2a collapses all textual searches into a single "Keyword" parameter set, alternative embodiments may provide more granularity in the selection of textual parameters. For example, each domain may be given a dedicated textual parameter set selectable for searching.

FIG. 3d presents a diagram of the compact graphical user interface after filtering a content set using an image data domain and a color tags domain selected in FIG. 3b, according to one embodiment of the present invention. Diagram 300d of FIG. 3d includes application interface 301. Application interface 301 includes filtered content panel 302, selected content panel 303 and compact search interface 352. Filtered content panel 302 includes digital picture 314 and 320. Digital picture 314 includes skier character 315 and yellow border 316. Digital picture 320 includes famous painter character 321 and purple border 322. Compact search interface 352 includes query field 350 and search button 351. Query field 350 includes character images 381-386. With respect to FIG. 3d, elements with like numbers may correspond to similar elements in FIG. 3c.

In FIG. 3d, compact search interface 352 may display the second graphical representation of a parameter set of image data domain selected in FIG. 3c. As explained above, the second graphical representation of a parameter set may comprise character images 381-386. In this embodiment of the invention as shown in FIG. 3d, character image 382, 383, 385, and 386 have been selected as a second parameter subset for filtering the content set.

The search query thus comprises a first parameter subset of character image 382, 383, 385, and 386 and a second parameter subset of graphic icon 371, 373, and 376 selected in FIG. 3b. In the embodiment of the invention as shown in FIG. 3d, both parameter subsets may be used to filter the content set and each element in the content set may satisfy the search query by matching at least one element from both parameter subsets. In other embodiments of the invention, data matching only one element from either of the first or second parameter subset may be included into the search result. In further alternative embodiments of the invention, other well-known Boolean filtering methodologies utilizing both parameter subsets for filtering may be applied to the content set. Select button 351 may be used to start filtering of the content set. Alternatively or additionally, the filtering may be engaged automatically as elements from the parameter sets are selected, or as text is entered.

Thus, in alternative embodiments of the invention, textual keywords may also be combined with both parameter subsets to form the search query. As explained earlier, user may have selected from compact search interface 352 the option to enter textual keywords into field query 350. The keywords may be used with other domains for filtering the content set.

Filtered content panel 302 may reflect the updated search result by displaying digital picture 314 and 320. Digital picture 320 may also be selected and shown as a magnified image in selected content panel 303. FIGS. 3a, 3b, 3c, and 3d demonstrate that one or more domains may be selected from compact search interface 352 for filtering a content set. In alternative embodiments of the invention, compact search interface 352 may be configured to filter data using only the most recently selected domain. Also, as previously described, in alternative embodiments of the invention, textual keywords and non-textual domains may be combined into a search query for filtering data.

Figure 4:
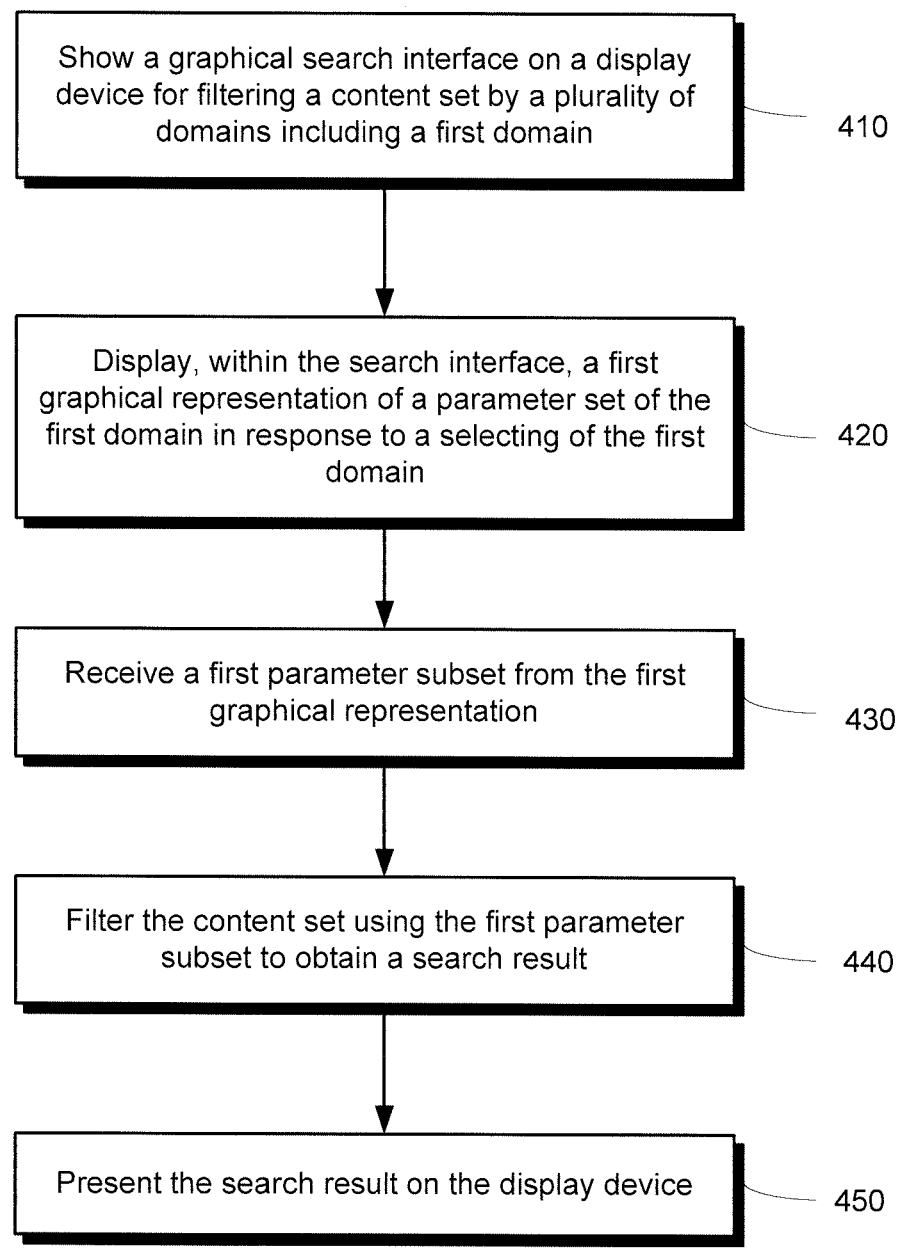
FIG. 4 shows a flowchart describing the steps, according to one embodiment of the present invention, by which a compact graphical user interface may be used to create a search query for a digital data search.

The systems shown in FIGS. 1, 3a, and 3b will now be further described by additional reference to FIG. 4. FIG. 4 shows a flowchart describing the steps, according to one embodiment of the present invention, by which a compact graphical user interface may be used to create a search query for a digital data search. Certain details and features have been left out of flowchart 400 that are apparent to a person of ordinary skill in the art. Thus, a step may comprise one or more sub-steps or may involve specialized equipment or materials, for example, as known the art. While steps 410 through 450 indicated in flowchart 400 are sufficient to describe one embodiment of the present method, other embodiments may utilize steps different from those shown in flowchart 400, or may include more, or fewer steps.

Referring to step 410 of flowchart 400 and FIG. 1 and FIG. 3a, step 410 comprises showing a compact search interface 352 on a display device 104 for filtering a content set by a plurality of domains including a first domain. As explained earlier, application interface 301, which includes compact search interface 352, may be shown on display device 104. Application interface 301 may be a user interface at the front end of a remote or local application. Compact search interface 352, which may offer search categories corresponding to a plurality of domains, may be used to set the criteria for filtering the content set, which may reside within content database 103. Processor 102 may thus filter the content set by accessing content database 103. When finished, processor 102 may display the search results onto display device 104.

The method of flowchart 400 continues with step 420. Referring to FIG. 3a, step 420 comprises displaying, within compact search interface 352, a first graphical representation of a parameter set of the first domain in response to a selecting of the first domain. Field query 350 comprises graphical icons 371-376. Graphical icons 371-376, a first graphical representation of a parameter set, may be displayed within field query 350 in response to selection of color tags domain, a first domain, from compact search interface 352. After the selection of a parameter set associated with the color tags domain from drop down box 226 of FIG. 2a, drop down box 226 may no longer be needed and may be rendered invisible.

Moving on to step 430 of flowchart 400 and referring to FIG. 3b, step 430 comprises receiving a first parameter subset from the first graphical representation of a parameter set selected in step 420. Compact search interface 352 comprises graphical icons 371-376. Graphical icons 371-376, as described previously, may correspond to the first graphical representation of a parameter set of the color tags domain. Any combination of graphical icons 371-376 may be selected to form a first parameter subset. In FIG. 3b, graphical icons 371, 373, and 376 have been selected to comprise the first parameter subset.

Proceeding to step 440 of flowchart 400 and referring to FIG. 3a and FIG. 3b, step 440 comprises filtering the content set using the first parameter subset obtained in step 430 to obtain search result. The first parameter subset, or graphical icons 371, 373, and 376, may thus be used to filter the content set. By using select button 351, user may cause application interface 301 to filter content set using the first parameter subset. Alternatively, the filtering may proceed automatically instead of manually. As previously described, the digital data of the content set may be matched to the elements of the first parameter subset during filtering. Any data matching any of the elements of the first parameter subset may be included in the search result. In FIG. 3*b*, the search result comprises digital pictures 311, 314, and 320.

Proceeding to step 450 and referring to FIG. 3*b* and FIG. 1, step 450 comprises presenting the search result of step 440 on the display device. Filtered content panel 302 may display the search result obtained from step 440, which may comprise digital picture 311, 314, and 320. Moreover, compact user interface 310, displaying the search result, may be presented on display device 104.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method comprising:
   showing a search interface on a display device for filtering a content set by a plurality of domains including a first non-textual domain, the search interface displaying the plurality of domains including the first non-textual domain for a selection by a user;
   in response to the selection of the first non-textual domain by the user, without searching or filtering the content set, receiving and displaying, within the search interface, a first non-textual graphical representation of a digital image set of the first non-textual domain, wherein each digital image of the digital image set of the first non-textual domain displays a respective non-textual graphical representation of a parameter associated with the first non-textual domain;
   receiving a first digital image selected by the user from the digital image set of the first non-textual graphical representation;
   filtering the content set using the first digital image to obtain a search result; and
   displaying the search result on the display device.

2. The method of claim 1, further comprising:
   receiving a second digital image selected by the user from the digital image set of the first non-textual graphical representation,
   wherein obtaining the search result further comprises filtering the content set using the second digital image.

3. The method of claim 1, wherein the digital image set includes character images, personality images and scene images.

4. A method comprising:
   showing a search interface on a display device for filtering a content set by a plurality of domains including a first non-textual domain, the search interface displaying the plurality of domains including the first non-textual domain for a selection by a user;
   in response to the selection of the first non-textual domain by the user, receiving and displaying, within the search interface, a first non-textual graphical representation of a digital image set of the first non-textual domain, each digital image of the digital image set of the first non-textual domain depicting a respective parameter associated with the first non-textual domain;
   receiving a first digital image selected by the user from the digital image set of the first non-textual graphical representation;
   filtering the content set using the first digital image to obtain a search result;
   displaying the search result on the display device;
   replacing the first non-textual graphical representation in the search interface with a text entry box in response to a selection of a textual parameter set of a textual domain of the plurality of domains;
   receiving a textual parameter of the textual parameter set from the text entry box;
   filtering the content set using the textual parameter to update the search result; and
   displaying the updated search result on the display device.

5. The method of claim 1, wherein each content in the content set includes a color border, and wherein the method further comprises:
   displaying, within the search interface, a second non-textual graphical representation of a color set of a second non-textual domain;
   receiving a first color selected by the user from the color set of the second non-textual graphical representation;
   filtering the content set using the first color to obtain a second search result including the content having the color border that matches the first color; and
   displaying the second search result on the display device.

6. The method of claim 5, further comprising:
   receiving a second color selected by the user from the color set of the second non-textual graphical representation, and the filtering further filters the content set using the second color to obtain the second search result.

7. The method of claim 5, further comprising:
   replacing the second non-textual graphical representation in the search interface with a text entry box in response to a selection of a textual parameter set of a textual domain of the plurality of domains;
   receiving a textual parameter of the textual parameter set from the text entry box;
   filtering the content set using the textual parameter to update the second search result;
   displaying the updated second search result on the display device.

8. The method of claim 5, wherein the plurality of domains include a third non-textual domain including three-dimensional models.

9. The method of claim 8, wherein the third non-textual domain includes a third non-textual graphical representation including at least one graphical icon.

10. A device comprising:
    a processor configured to:
      show a search interface on a display device for filtering a content set by a plurality of domains including a first non-textual domain, the search interface displaying the plurality of domains including the first non-textual domain for a selection by a user;

in response to the selection of the first non-textual domain by the user, without searching or filtering the content set, receive and display, within the search interface, a first non-textual graphical representation of a digital image set of the first non-textual domain, wherein each digital image of the digital image set of the first non-textual domain displays a respective non-textual graphical representation of a parameter associated with the first non-textual domain;

receive a first digital image selected by the user from the digital image set of the first non-textual graphical representation;

filter the content set using the first digital image to obtain a search result; and display the search result on the display device.

11. The device of claim 10, wherein the processor is further configured to receive a second digital image selected by the user from the digital image set of the first non-textual graphical representation, and wherein obtaining the search result further comprises filtering the content set using the second digital image.

12. The device of claim 10, wherein the digital image set includes character images, personality images and scene images.

13. The device of claim 10, wherein the processor is further configured to:

replace the first non-textual graphical representation in the search interface with a text entry box in response to a selection of a textual parameter set of a textual domain of the plurality of domains;

receive a textual parameter of the textual parameter set from the text entry box;

filter the content set using the textual parameter to update the search result;

display the updated search result on the display device.

14. The device of claim 10, wherein each content in the content set includes a color border, and wherein the processor is further configured to:

display, within the search interface, a second non-textual graphical representation of a color set of a second non-textual domain;

receive a first color selected by the user from the color set of the second non-textual graphical representation;

filter the content set using the first color to obtain a second search result including the content having the color border that matches the first color; and display the second search result on the display device.

15. The device of claim 14, wherein the processor is further configured to:

receive a second color selected by the user from the color set of the second non-textual graphical representation, and wherein the filtering further filters the content set using the second color to obtain the second search result.

16. The device of claim 14, wherein the processor is further configured to:

replace the second non-textual graphical representation in the search interface with a text entry box in response to a selection of a textual parameter set of a textual domain of the plurality of domains;

receive a textual parameter of the textual parameter set from the text entry box;

filter the content set using the textual parameter to update the second search result;

display the updated second search result on the display device.

17. The device of claim 14, wherein the plurality of domains include a third non-textual domain including three-dimensional models.

18. The device of claim 17, wherein the third non-textual domain includes a third non-textual graphical representation including at least one graphical icon.

19. The method of claim 1, wherein the first non-textual domain is one of a color domain, a sound domain, or a graphical icon domain.

20. The device of claim 10, wherein the first non-textual domain is one of a color domain, a sound domain, or a graphical icon domain.

* * * * *